(12) United States Patent
Hernacki et al.

(10) Patent No.: US 7,421,737 B1
(45) Date of Patent: Sep. 2, 2008

(54) EVASION DETECTION

(75) Inventors: Brian Hernacki, San Carlos, CA (US); Jeremy Bennett, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 750 days.

(21) Appl. No.: 10/839,736

(22) Filed: May 4, 2004

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .............. 726/22; 726/23; 726/24; 726/25

(58) Field of Classification Search .............. 726/23
See application file for complete search history.

(56) References Cited

U.S. PATENT DOCUMENTS

| | | | |
|---|---|---|---|
| 7,046,653 B2 | 5/2006 | Nigrin et al. | |
| 7,114,181 B2 | 9/2006 | Ramaiah et al. | |
| 7,171,683 B2 * | 1/2007 | Pazi et al. | 726/13 |
| 2003/0084319 A1 * | 5/2003 | Tarquini et al. | 713/200 |
| 2003/0112780 A1 | 6/2003 | Ouyang et al. | |
| 2003/0172289 A1 * | 9/2003 | Soppera | 713/200 |

OTHER PUBLICATIONS

Thomas Ptacek, "Insertion, Evasion, and Denial of Service: Eluding Network Intrusion Detection", 1998, Secure Networks, Inc., pp. 1-67.*
U.S. Appl. No. 10/839,737, Hernacki et al.

* cited by examiner

*Primary Examiner*—Benjamin E Lanier
(74) *Attorney, Agent, or Firm*—Van Pelt, Yi & James LLP

(57) ABSTRACT

Evasion detection is disclosed. Techniques are provided for network security, including comparing a received header value to a baseline header value, determining based on the comparison whether a threshold has been satisfied, and generating an alert if the threshold has been satisfied. Header values may be representative of data included in packet headers that, depending upon a data communication protocol in use (e.g., TCP, IP, etc.) may include information such as a time-to-live (TTL) value or IP options. After retrieving a received packet's header value, it is compared to a baseline header value and, in combination with evaluating a flip count threshold, used to detect an evasion attempt.

15 Claims, 8 Drawing Sheets

EVASION DETECTION

CROSS REFERENCE TO RELATED APPLICATIONS

This application is related to co-pending U.S. patent application Ser. No. 10/839,737 entitled "Detecting Network Evasion and Misinformation" filed concurrently herewith, which is incorporated herein by reference for all purposes.

FIELD OF THE INVENTION

The present invention relates generally to network security. More specifically, detection of evasion techniques is disclosed.

BACKGROUND OF THE INVENTION

Network security applications include techniques for attempting to detect, halt, or prevent attacks borne upon network assets (e.g., computers, servers, databases, etc.). While intrusion detection systems (IDS) attempt to observe data traffic as viewed at a monitoring point remote from a host that may be the target of an attack, such as at a firewall, the data traffic actually received by the target host may be different than the traffic as viewed at the monitoring point. Due to the different perspectives between an IDS and a host, an attacker may be able to send diversionary packets that enables a data flow or data stream to carry an attack to a victim host, without alerting an IDS, or conversely to deceive an IDS into believing that a particular attack is being attempted when in fact it is not. Attack signatures and known threat patterns can be obfuscated using evasive data flow techniques.

Protocols such as TCP/IP and others can be exploited by attackers by altering the method in which data traffic is sent between a source and a host or by modifying the actual data stream and individual packets. Protocol exploitation may be used to add packets to a particular data stream to confuse an IDS or mask and obfuscate an attack. By modifying a data flow or stream, for example, by adding additional packets that would prevent an IDS from pattern matching or recognizing an attack, an attacker can evade detection and perform a successful attack, hack, or compromise of an asset. Further, data communication protocols provide a specific standardized set of algorithms for handling data traffic and, in so doing, provide the ability for an attacker to recognize and exploit a weakness in the protocol, particularly for destination hosts reassembling transmitted data packets, frames, segments, etc.

Thus, what is needed is a solution for detecting an evasive attack. Further, a solution for detecting evasive attacks exploiting data communication protocols is also desirable.

BRIEF DESCRIPTION OF THE DRAWINGS

Various embodiments of the invention are disclosed in the following detailed description and the accompanying drawings.

DETAILED DESCRIPTION

Figure 1:
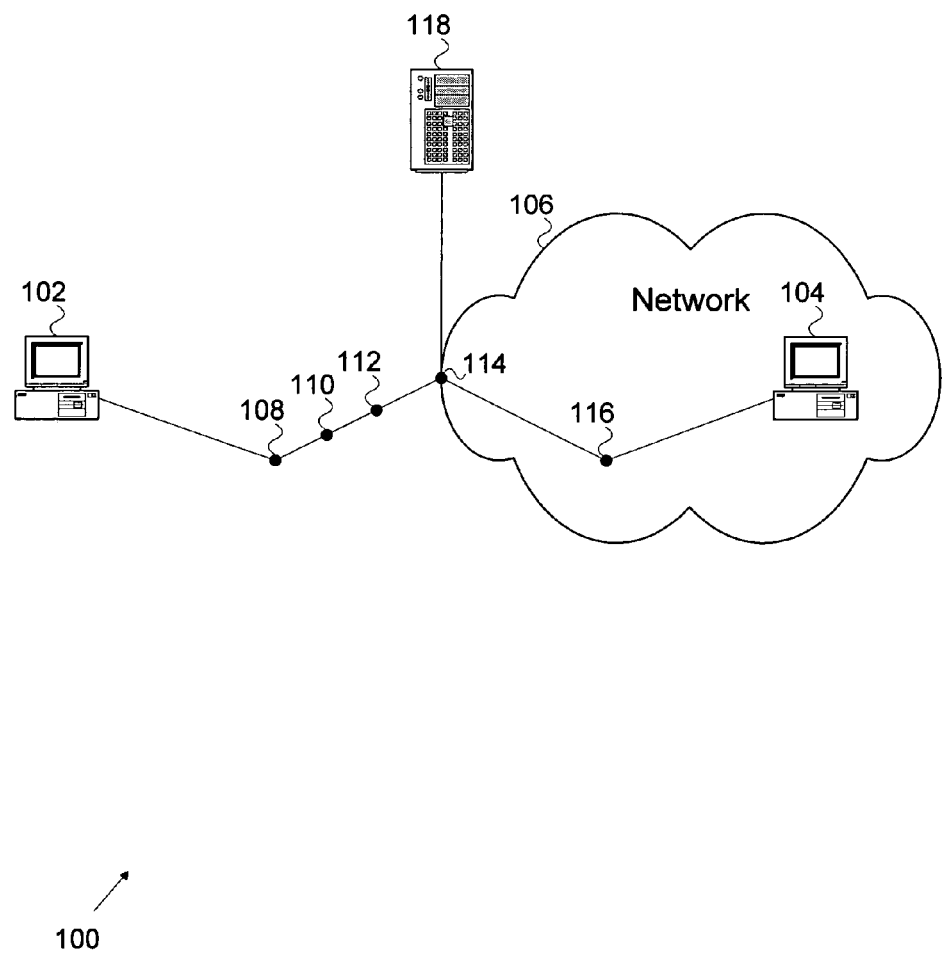
FIG. 1 illustrates an evasion detection system in accordance with an embodiment.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Attackers can send a data stream that might contain packets intended to reach a particular point in a network, but not the victim host (destination), relying upon data communication protocols (e.g., TCP, IP, etc.) to provide predictable handling of received data packets. An attacker can deliver an attack, evading an IDS or other network security application, by sending data that masks or obfuscates pattern matching and exploits the manner in which received data is handled at a destination host, the IDS, or one or more intermediate network nodes. An evasive data flow or stream may contain, for example, additional packets to obfuscate or prevent an IDS from learning that an attack is being delivered to a victim host. Likewise, packets may be included that cause an IDS to determine that an attack is taking place when in fact the packets comprising the attack never reached the target host, resulting in a false detection event. Such evasions may be performed by adjusting packet header information such as time-to-live (TTL) values or other IP options, masking the overall attack signature of a data flow by altering individual data packets and their headers to create unrecognizable, unmatchable, and/or innocuous patterns or signatures. As described herein, evasion detection identifies masked or obfuscated attacks, or attacks calculated to generate a false detection by an IDS, by detecting the changes in received packet headers, thus enabling alert generation, multiple stream reassembly, or other countermeasures to be invoked to defeat attackers.

TTL values identify the number of hops that a packet may be forwarded across before being discarded. When a TTL expires, the current router discards the associated packet. In a TTL-based evasion attack, additional packets are sent past an observation point, with a TTL that is high enough to forward the packet past the IDS without being discarded. However, once past the IDS, the TTL of the extra packets are set to expire before it reaches the target host associated with the destination to which the packet is addressed and, subsequently, the packets is discarded before it reaches the target host. These packets may be added to a data stream to confuse the IDS and prevent it from, among other activities, matching an attack signature or pattern and either blocking or preventing the attack data flow from reaching the victim host. In one example, using protocols such as TCP, packets may be retransmitted in sequential order. An attack may be sent to a victim host as retransmitted packets. The retransmitted packets are ignored by the IDS, which believes them to be duplicative of earlier-received packets, and are able to reach the target host, which never received (or ignored, e.g., in the case of an IP options-based evasion) the corresponding packets received earlier by the IDS. Other examples are provided below.

FIG. 1 illustrates an evasion detection system in accordance with an embodiment. System 100 includes an attacker 102 sending an attack to host 104 on network 106. Routed through intervening external network nodes 108-112, firewall 114, and internal network node 116, data sent from attacker 102 are transmitted with the intent to evade evasion detection system (EDS) 118. EDS 118 may be implemented as part of a network intrusion detection system (NIDS), firewall, proxy server, or other security application. EDS 118 may also be implemented as a standalone application or utility as well.

Each of the hops between nodes 108-116 represents a router, server, or other routing device along the path length between attacker 102 and host 104. Fewer or more hops may be included, depending upon network routing conditions (e.g., casualties, packet loss, latency, etc.) and configurations. The hops between nodes 108-112 represent intermediate distances along an internetwork such as the Internet. Alternatively, hops between nodes 108-112 may also be within a larger WAN or other similar network. Node 114 is intended to be an egress/ingress node to/from network 106 and node 116 is internal to network 106. Node 114 may be implemented as an edge router or other device acting as a gateway to network 106.

Packets, as used in the Internet Protocol (IP) for example, may be transmitted across each hop, with each node being configured to decrement a time-to-live (TTL) value. As used herein, packets, segments, fragments, frames, or other forms for encapsulating data are referred to as "packets." TTL represents the number of hops that a packet may traverse before being discarded. Each packet sent between a source (SRC) and a destination (DST) node, host, terminal, server, etc. includes a TTL value that ensures that packets that for whatever reason are not able to reach their destination within a prescribed number of network hops do not persist in and potential degrade the performance of the network.

Figure 2:
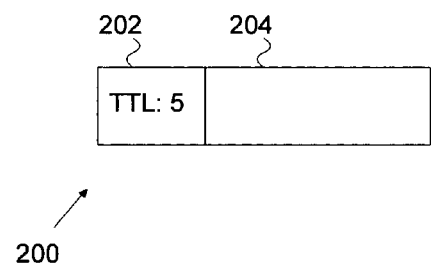
FIG. 2 illustrates a data packet including a TTL, in accordance with an embodiment.

FIG. 2 illustrates a data packet 200 including a TTL, in accordance with an embodiment. Included within the packet header 202 is a TTL value, in this example, "5." The packet body 204 may include a payload, IP options, additional header values, or other data.

In an attack, an attacker 102 can attempt to misguide or evade an EDS 118 by sending additional packets to be viewed by EDS 118, which are configured such that they will not be received or will be ignored at target host 104 (in the example shown in FIG. 1). By manipulating a value in packet header 200, an attacker can obfuscate the pattern or signature of an attack by inserting additional packets into the data flow. The additional packets may be intended to mask an incoming attack from detection, or to cause the EDS and/or another security system to falsely conclude that an attack has taken or is taking place. However, EDS 118 can detect an evasion attempt by evaluating the data flow and the packet header values (e.g., TTL), as described in connection with FIGS. 7 and 8 below.

Figure 3:
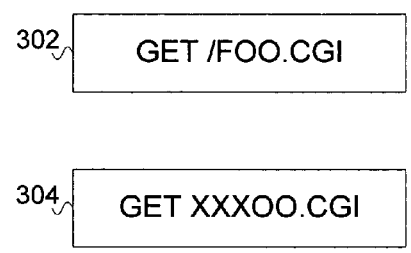
FIG. 3 illustrates a comparison between valid data and evasion data, in accordance with an embodiment.

FIG. 3 illustrates a comparison between data as received by an NIDS and data as received by a target host, in accordance with an embodiment. In this example, a first data stream may be sent with a message "GET /FOO.CGI," which is not associated as shown by valid stream 302. The stream 302 is "valid" in the sense that it is supposed in this example that it does not correspond to any attack or known attack signature. However, an attacker may attempt to disguise an attack in order to avoid detection by a NIDS (or other security device or application), such as by sending the valid stream 302 in such a way that the NIDS will believe that only innocuous traffic is being sent to the target host when in fact the data stream as seen by the target host includes the attack stream 304. Attack data stream 304 includes, in this example, attack "GET XXXOO.CGI". The attack data stream 304 is similar to that of valid data stream 302, except that instead of "/F," "XXX" has been substituted. By causing the NIDS to believe that the valid data stream 302 has been received by the target host, when in fact the attack data stream 304 was received by the target host, attacker 102 may be able to avoid detection, thus enabling an attack to evade detection by the NIDS.

Figure 4:
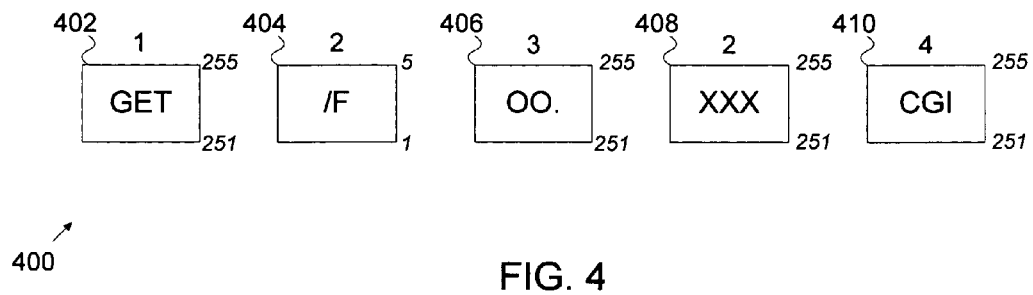
FIG. 4 illustrates a data flow using an evasion technique, in accordance with an embodiment.

FIG. 4 illustrates a data flow using an evasion technique, in accordance with an embodiment. Attack data flow 400 has been broken into several packets 402-410. Attack data flow 400 may also be referred to as an evasion data stream. Using IP as a data transmission protocol, packets 402-410 are transmitted and reassembled in proper order, regardless of the order in which the packets are received at host 104. However, if a packet is lost (i.e., times out or TTL expires), copies of the lost packets may be retransmitted. An attacker can take advantage of the retransmission mechanisms of a protocol such as IP and, because a NIDS may have already seen the original packet, the retransmitted packet may be ignored at the NIDS.

As shown in this example, packets 402-406 are transmitted from a source to a destination. The number shown above each of the packets (e.g., "1", "2", "3", etc.) represents a sequence number indicating the order in which the packets are to be reassembled, regardless of the order of transmission. The number near the upper right corner of each packet represents the original TTL value included by the source node, and the number near the bottom right corner indicates the TTL value at the time the packet has reached the NIDS (i.e., after having been decremented by the intervening network nodes that forwarded the packet on to the node at which the NIDS is configured to monitor network traffic flows to/from the target host. In this example, four intervening nodes have processed each packet, as indicated by the fact that in each case the TTL value has been decremented to be four less than the original value set by the source node. However, in this example, assume that packets sent to the target host must traverse at least one internal network node, downstream from the point at which the NIDS is configured to monitor network flows associated with the target host (see, e.g., FIG. 1). Assuming that were the case, the packet 404 (bearing sequence number "2") would never have reached the target host, because the intervening node would have, upon receiving that packet, decremented the TTL to zero and as a result would have dropped the packet instead of forwarding it on to the target host. When the attacker subsequently sends packet 408 including an attack or portion thereof (i.e., "XXX") designating the packet as sequence number "2", the NIDS typically will be configured to ignore the packet 408, e.g., because it believes the packet to be an unneeded retransmission of a packet that has already been received successfully in the form of packet 404. Using this evasion technique, an attacker can cause a NIDS or other security device or application to believe that the target host has received an innocuous data stream, such as the valid data stream 302 of FIG. 3, when in fact the data stream as seen by the target host comprises an attack, such as the hypothetical attack data stream 304 of FIG. 3. The same technique may be used, of course, to cause the NIDS to believe that an attack stream has been received by the target host when in fact it has not, e.g., to cause the NIDS and/or security personnel to become occupied processing a false alarm while other attacks are perpetrated. However, by evaluating the TTL values of packets associated with a network flow, as described below in connection with FIGS. 7-8D, it can be determined whether an evasion technique of the type described above has been or is being employed.

Figure 5:
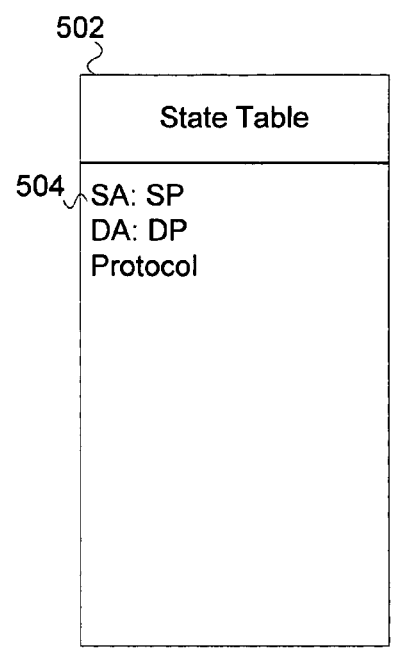
FIG. 5 illustrates a state table for evasion detection, in accordance with an embodiment.

FIG. 5 illustrates a network flow state table, in accordance with an embodiment. In this example, state table 502 includes routing information 504 that may be used to identify and organize data associated with a network flow between a source and a destination. For example, SRC address and a SRC port may be indicated along with a DEST address and DEST port, and protocol. The protocol specifies how data is to be sent, received, reassembled, and handled. Many NIDS use this "quintet" of information to uniquely identify each network flow.

Figure 6:
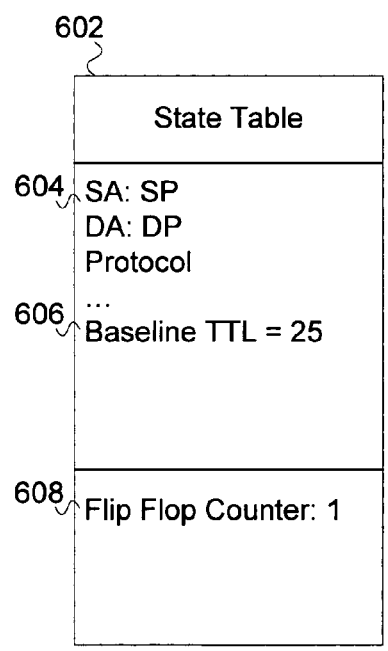
FIG. 6 illustrates a state table for evasion detection, in accordance with an alternative embodiment.

FIG. 6 illustrates a network flow state table configured with additional values to be used for evasion detection, in accordance with an embodiment. Routing information 604 is similar to routing information 504 shown in FIG. 5 and is similarly used to identify a network flow. Additional information may also be recorded in state table 602, including a baseline TTL 606 and a TTL Flip Flop (FF) counter 608.

Baseline TTL 606 may be established to provide a parameter that can be used to evaluate incoming data packets to determine whether an evasion attempt is present. By evaluating received header values (in this example, received packet header TTL values), evasion detection may be implemented by comparing the received values to a recorded baseline TTL. In some embodiments, baseline TTL may be adjusted, reset, or configured, either manually or automatically by a system implementing EDS 118 (FIG. 1). The flip flop counter 608 may be used to keep track of a number of packets that have been received having a TTL value different than the baseline. As described below, such data may be useful in distinguishing between deviations from the TTL baseline that occur due to short term or long term changes in how network traffic associated with a flow is routed and deviations that may indicated an evasion attempt. The process of evasion detection using TTL values will be discussed in greater detail below in connection with FIGS. 7 and 8.

Figure 7:
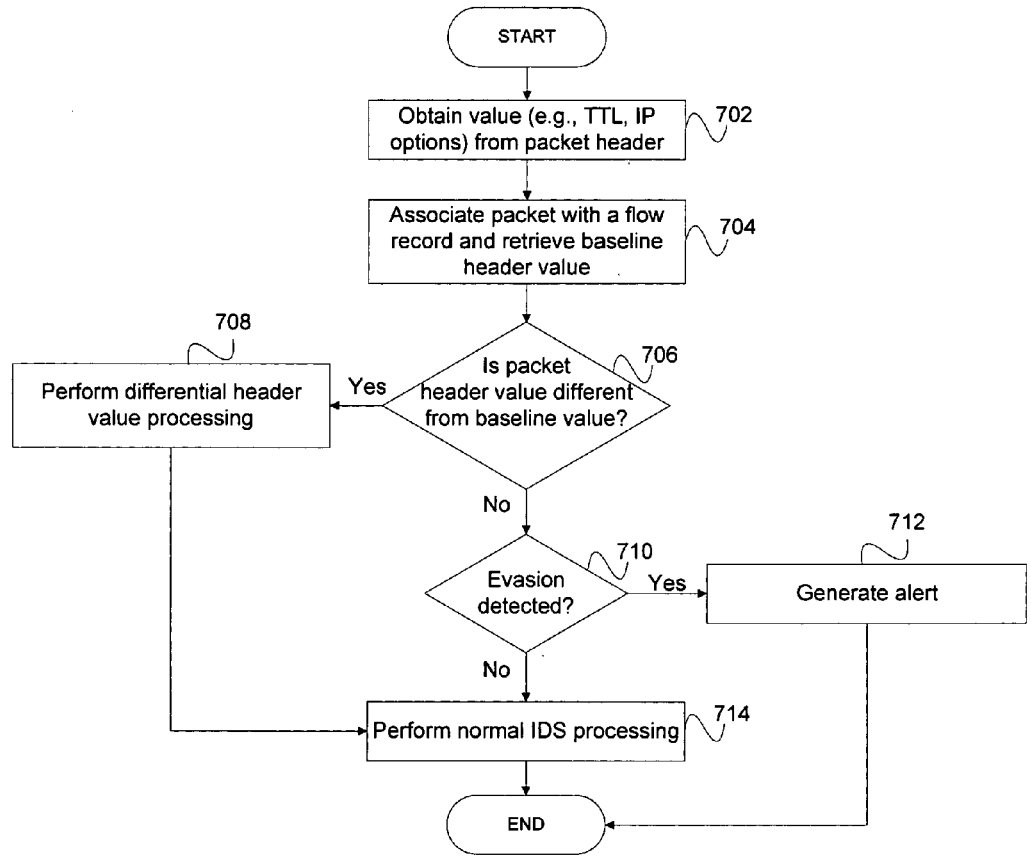
FIG. 7 illustrates an overall process for evasion detection, in accordance with an embodiment.

FIG. 7 illustrates an overall process for evasion detection, in accordance with an embodiment. The overall process starts by obtaining a value from a packet header (702). The packet header value may also be referred to as a received header value and may include TTL, IP options, or other data included in an encapsulation header. Once the received header value (i.e., packet header value) has been obtained, the packet undergoing evaluation is associated with a flow record (704). Packet header value may also be referred to as a received header value. A flow record may include a state table, as described above in connection with FIGS. 5 and 6, but may also include records, fields, databases, repositories, or other data structures that can be used for storing data and information. In connection with the association of the packet with a flow record, a baseline header value may be retrieved from, for example, a database (704). The baseline header value may be used to evaluate the received header value of the packet.

Once a baseline TTL value has been retrieved, EDS 118 compares the packet header value to the baseline header value to determine whether the former is different from the latter (706). If the received packet header value is different from that of the baseline header value, then differential header value processing is performed (708). Differential header value processing will be explained in greater detail below in connection with FIG. 8C. Once the differential header value processing has been performed, the packet proceeds to normal NIDS processing (714). However, if the received packet header value is the same as that of the baseline header value, then a determination is made as to whether an evasion attempt has been detected (710). The process for evasion detection is explained in greater detail below in connection with FIG. 8D.

If an evasion attempt is detected, then an alert is generated and sent to a security administrator or application to invoke protective measures, such as blocking the data flow/stream containing an attack (712). Other protective measures, such as blocking or hardening may also be invoked as a result of the received alert. However, if evasion is not detected, then normal IDS processing continues (714). Normal IDS processing may include monitoring data communications between external hosts and hosts on a network for known attack signatures, pattern matching, or other security activities intended to protect network assets. Once an alarm has been generated (712) or normal NIDS processing has been performed (714), the process ends.

Figure 8A:
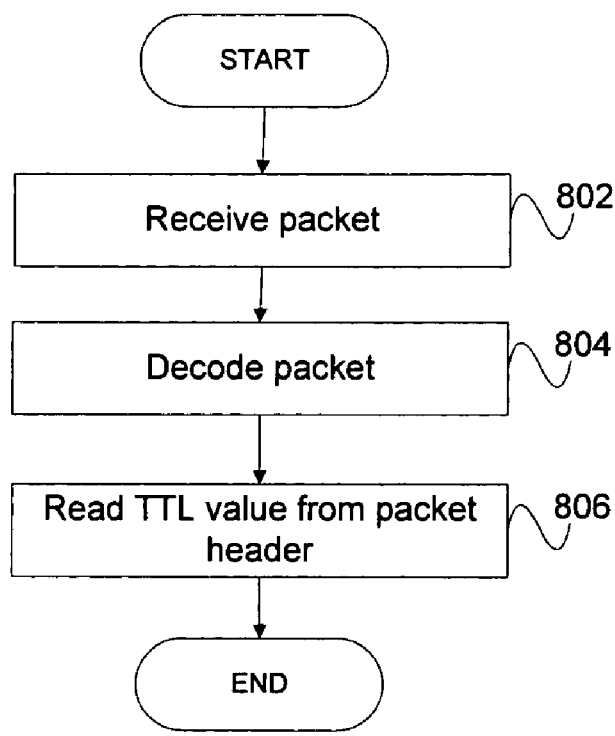
FIG. 8A illustrates a process for obtaining a received header value, in accordance with an embodiment.

FIG. 8A illustrates a process for obtaining a received header value, in accordance with an embodiment. In one embodiment, the process shown in FIG. 8A is used to obtain a header value as in step 702 of FIG. 7. In this example, a packet is received (802). The packet may be received at an egress/ingress/edge router to a network, providing a location for a copy to be sent to EDS 118 and eventual forwarding to an end destination, such as host 104. The packet may also be received directly at EDS 118.

Once received, the packet and data included within it are decoded (804). Header data such as TTL and other information may be decoded from the packet. Once decoded, the TTL value may be read from the packet (806), enabling the received header value (i.e., TTL) to be further evaluated as described above in connection with FIG. 7.

Figure 8B:
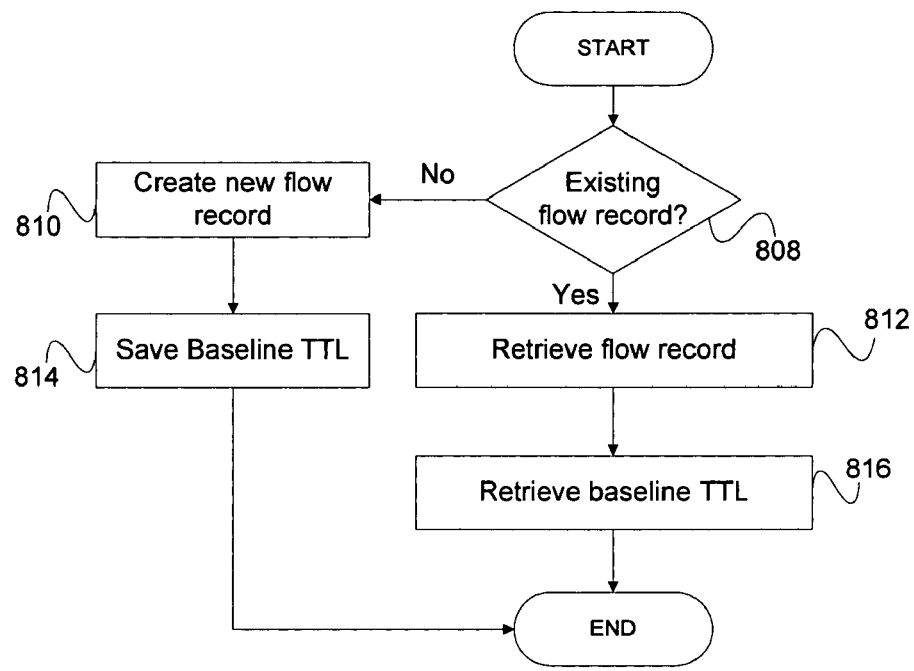
FIG. 8B illustrates a process for associating a packet with a flow record and retrieving a baseline header value, in accordance with an embodiment.

FIG. 8B illustrates a process for associating a packet with a flow record and retrieving a baseline header value, in accordance with an embodiment. In one embodiment, the process shown in FIG. 8B may be used to associate a packet with a flow record and retrieve a baseline header value, as in step 704 of FIG. 7. A check is performed to determine whether a flow record exists for the data flow being evaluated (808). If no flow record exists, then a new flow record is created (810) and the TTL value of the received packet is saved in the flow record as the baseline TTL value (814). If a flow record does exist, then the record is retrieved (812).

The baseline TTL for the data flow under examination is retrieved (816). Once a baseline TTL has been retrieved and/or saved, either in an existing or new flow record, the process of FIG. 8B ends.

Figure 8C:
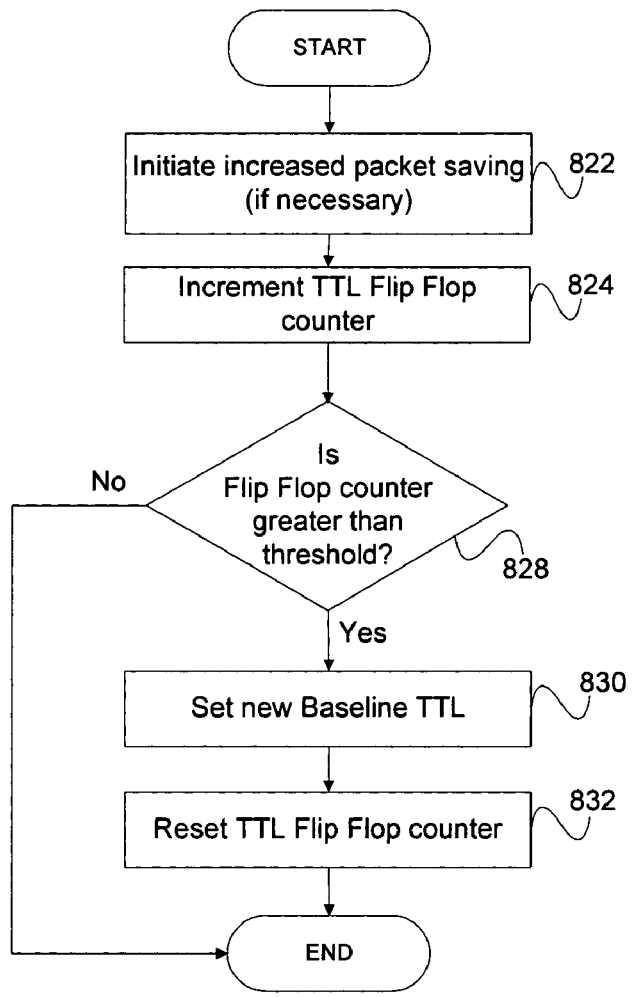
FIG. 8C illustrates a process for differential header value processing, in accordance with an embodiment.

FIG. 8C illustrates a process for differential header value processing, in accordance with an embodiment. If a received packet header value is different from the baseline value, determined as described above in FIG. 8B, then differential header value processing is performed. In one embodiment, the process shown in FIG. 8C is used to implement step 708 of FIG. 7. Differential header value processing begins by initiating the saving of packets that are retransmits of previously-received packets and/or other packets that would normally otherwise be ignored, to enable the EDS to reassemble multiple versions of the flow, if necessary (822). Packet reassembly may be performed, for example, to compare a received (actual) data flow to a data flow observed by an IDS or EDS 118. In so doing, the comparison helps to determine what an attacker intends security applications to "see" versus what target host actually receives.

Referring further to FIG. 8C, once increased packet saving has been initiated, a counter is incremented (824). In this case, the counter may be used to count the number of packets where a TTL that is different from the baseline is observed. In other embodiments, other characteristics may be counted in order to determine a change. For example, in other embodiments, other indicators such as IP options or other types of packet header data may be monitored for deviations from a baseline or expected value. In still other embodiments, another mechanism other than a counter (e.g., TTL flip flop counter) may be used.

After incrementing the TTL flip flop counter, a decision is made as to whether the current TTL flip flop count is greater than a threshold count (828). The threshold count represents the number of consecutive packets having a TTL value different from the baseline value beyond which it is believed that the deviation from the baseline is likely attributable to a short term or long term change in network routing of packets associated with the flow, e.g., due to an equipment failure. Stated another way, the threshold is used to distinguish between possible evasion attempts and other reasons for a change in the TTL values as observed at the NIDS, on the assumption that in the case of an evasion the attacker would at most seek to insert a small number of packets that would expire before reaching the target host, and then would return to sending packets having the original, baseline TTL value (or some new value that would become the new baseline). Routing changes can occur due to network conditions such as equipment casualties, ISP changes, or other events that could affect the path length between a source and a destination. A minor routing change may be indicative of a temporary loss of a router or intermediate device, thus causing a longer routing and, subsequently, increased TTLs. A major routing change may indicate the long-term or permanent loss of an intermediate device. However, a TTL change that persists for a small number of packets at a different (e.g., higher or lower) TTL and then quickly reverts to the original baseline TTL may be indicative of an evasion attempt. This is described in greater detail below in connection with FIG. 8D.

If the flip flop counter is greater than the threshold, then a new baseline TTL is set (830). Once set, the new baseline TTL indicates that a new time-to-live value exists for the data flow being examined (e.g., due to a routing change). The flip flop counter is then reset (832) and the process ends. If it is instead determined in step 828 that the TTL flip flop counter is not greater than the threshold, the process of FIG. 8C ends without setting a new baseline and without resetting the flip flop counter.

Figure 8D:
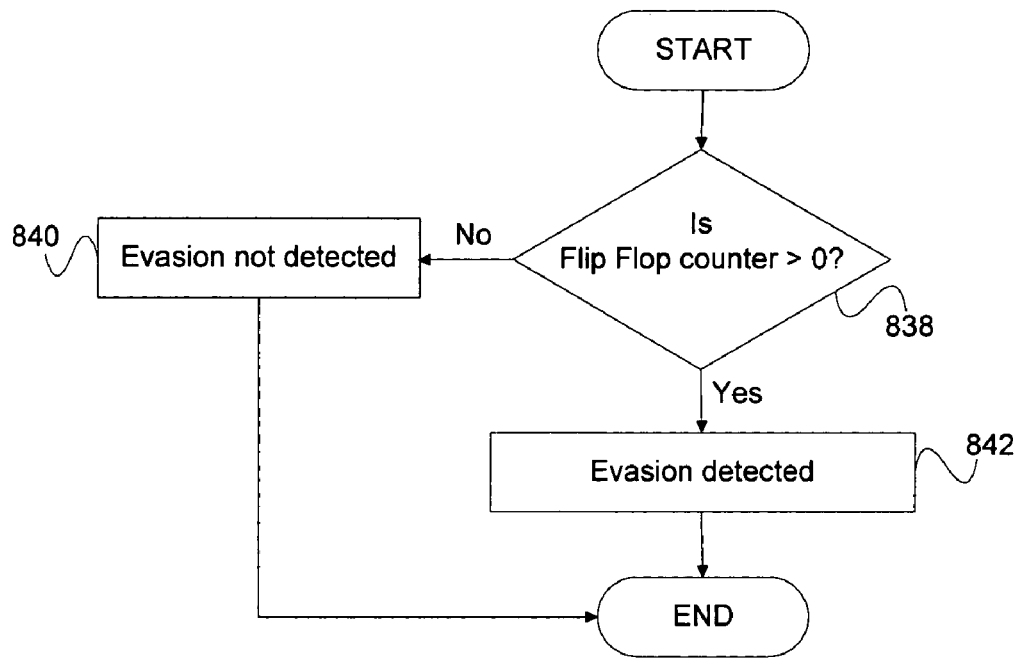
FIG. 8D illustrates a process for evasion detection, in accordance with an embodiment.

FIG. 8D illustrates a process for evasion detection, in accordance with an embodiment. In one embodiment, the process of FIG. 8D is used to implement step 710 of FIG. 7. During evasion detection, the TTL flip flop counter is evaluated to determine whether it is greater than 0 (838). If the TTL flip flop counter registers a count which is not greater than 0, then it is concluded that an evasion attempt has not been detected (840) and the process of FIG. 8D ends. The conclusion that no evasion has been detected if the flip flop counter is not greater than zero flows from the fact that in such a circumstance the flip flop counter, which cannot be negative, has not been incremented above its reset value of zero. Such a state indicates that the received header value is the same as the baseline and that no immediately preceding packet deviated from the baseline (i.e., there has not been any change or flip flop). If the TTL flip flop counter registers a count that is greater than 0, then it is concluded that an evasion has been detected (842) and the process of FIG. 8D ends. A non-zero value for the flip flop counter would by inspection be less than or equal to the threshold, because if the value had ever gotten to be greater than the threshold, a new baseline would have been established and the flip flop counter reset to zero (FIG. 8C). Therefore, if the current packet TTL is the same as the baseline (step 706 of FIG. 7) and the flip flop counter has a non-zero value, that would indicate that a number of preceding packets that is less than or equal to the threshold number deviated from the baseline TTL, followed by a return to packets using the original baseline TTL, which as explained above may indicate that a TTL-based evasion technique has been employed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing network security, comprising:
    comparing a received header value to a baseline header value;
    determining based on the comparison whether a detection criterion has been satisfied;
    generating an alert if the detection criterion has been satisfied; and
    not generating the alert if the detection criterion has not been satisfied;
    wherein the detection criterion is satisfied if the received header value does not differ from the baseline header value by more than a prescribed amount but a corresponding header value for each of one or more previous packets received prior to receipt of a received packet with which the received header value is associated did differ from the baseline header value by more than the prescribed amount.

2. A method as recited in claim 1 further including retrieving a record comprising the baseline header value.

3. A method as recited in claim 1 further including obtaining the received header value from a packet header.

4. A method as recited in claim 3 wherein obtaining the received header value from a packet header includes decoding the packet header.

5. A method as recited in claim 1 wherein the received header value is a time-to-live (TTL) value.

6. A method as recited in claim 1 wherein the baseline header value is a baseline TTL value.

7. A method as recited in claim 1 further including associating the received header value with a record.

8. A method as recited in claim 1 wherein comparing the received header value to the baseline header value further includes performing differential header value processing if the received header value is different from the baseline header value and not performing differential header value processing if the received header value is not different from the baseline header value.

9. A method as recited in claim 1 wherein determining based on the comparison further includes changing a counter based on a result of the comparing the received header value to the baseline header value.

10. A method as recited in claim 1 further including incrementing a counter when the comparison indicates that the received header value is different than the baseline header value.

11. A method as recited in claim 1 wherein determining based on the comparison whether a detection criterion has been satisfied further includes incrementing a counter.

12. A method as recited in claim 1 wherein determining based on the comparison whether a criterion has been satisfied further includes comparing a counter to a threshold value for the counter.

13. A method as recited in claim 1 wherein the received header value comprises a value for a header field in the header of a received packet associated with the received header value and determining based on the comparison whether a detection criterion has been satisfied comprises:
  determining that that header value is the same as the baseline header value;
  determining that one or more consecutive packets associated with the same flow with which the received packet is associated and received immediately before receipt of the received packet contained corresponding header values that were different than the baseline header value; and
  determining that the number of packets having a different value for the header value than the baseline value was less than or equal to an evasion detection threshold.

14. A system for providing network security, comprising:
  a processor configured to compare a received header value to a baseline header value, determine based on the comparison whether a detection criterion has been satisfied, generate an alert if the detection criterion has been satisfied, and not generate the alert if the detection criterion has not been satisfied; and
  a memory configured to store a record including the baseline header value;
  wherein the detection criterion is satisfied if the received header value does not differ from the baseline header value by more than a prescribed amount but a corresponding header value for each of one or more previous packets received prior to receipt of a received packet with which the received header value is associated did differ from the baseline header value by more than the prescribed amount.

15. A computer program product for providing network security, the computer program product being embodied in a computer readable storage medium and comprising computer instructions for:
  comparing a received header value to a baseline header value;
  determining based on the comparison whether a detection criterion has been satisfied;
  generating an alert if the detection criterion has been satisfied; and
  not generating the alert if the detection criterion has not been satisfied;
  wherein the detection criterion is satisfied if the received header value does not differ from the baseline header value by more than a prescribed amount but a corresponding header value for each of one or more previous packets received prior to receipt of a received packet with which the received header value is associated did differ from the baseline header value by more than the prescribed amount.

* * * * *